Nov. 24, 1970   D. E. NELSON   3,541,795
REGENERATIVE PISTON ENGINES
Filed Aug. 17, 1967   2 Sheets-Sheet 1
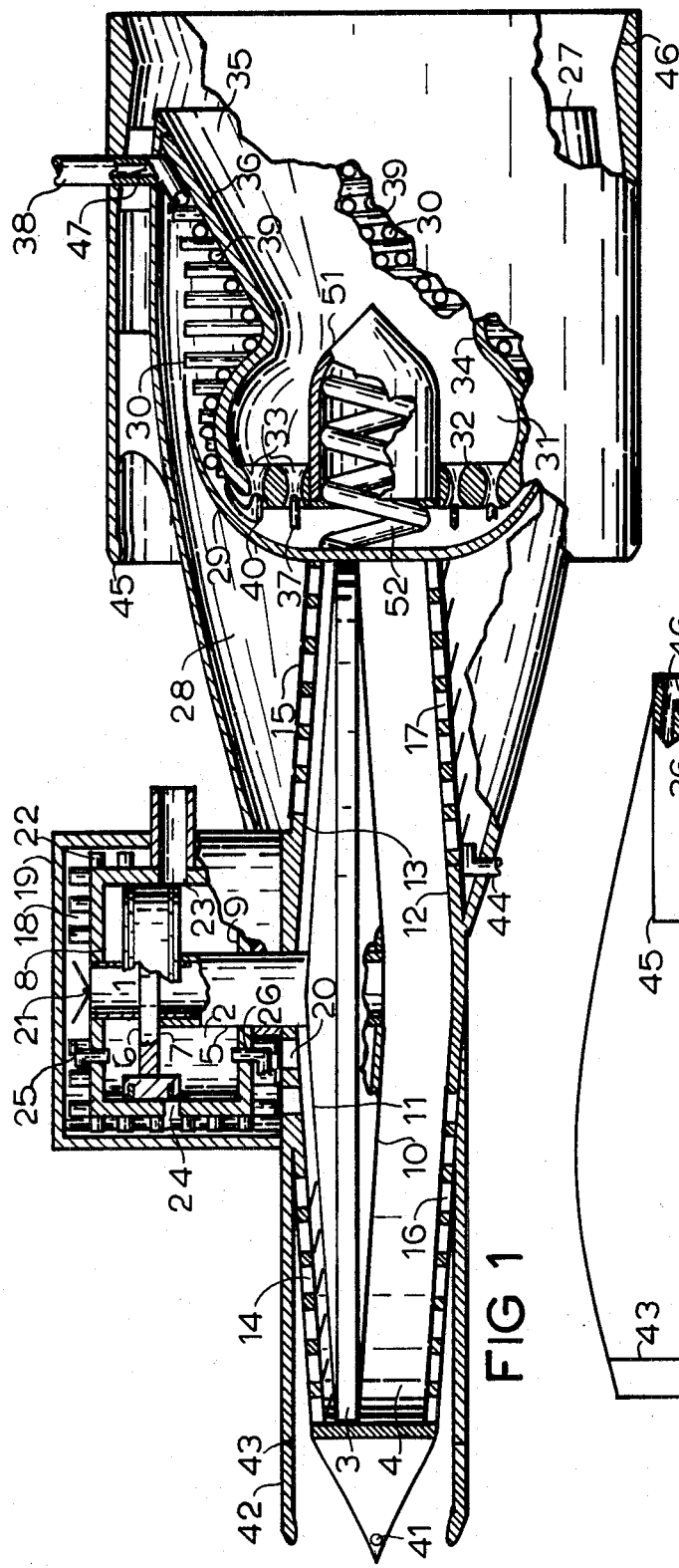
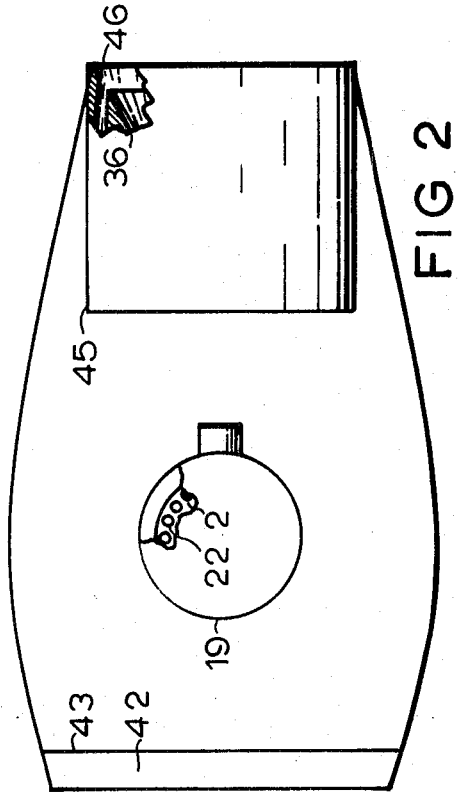
INVENTOR.
Daniel E. Nelson
R.A. Dresser
BY
Daniel E. Nelson

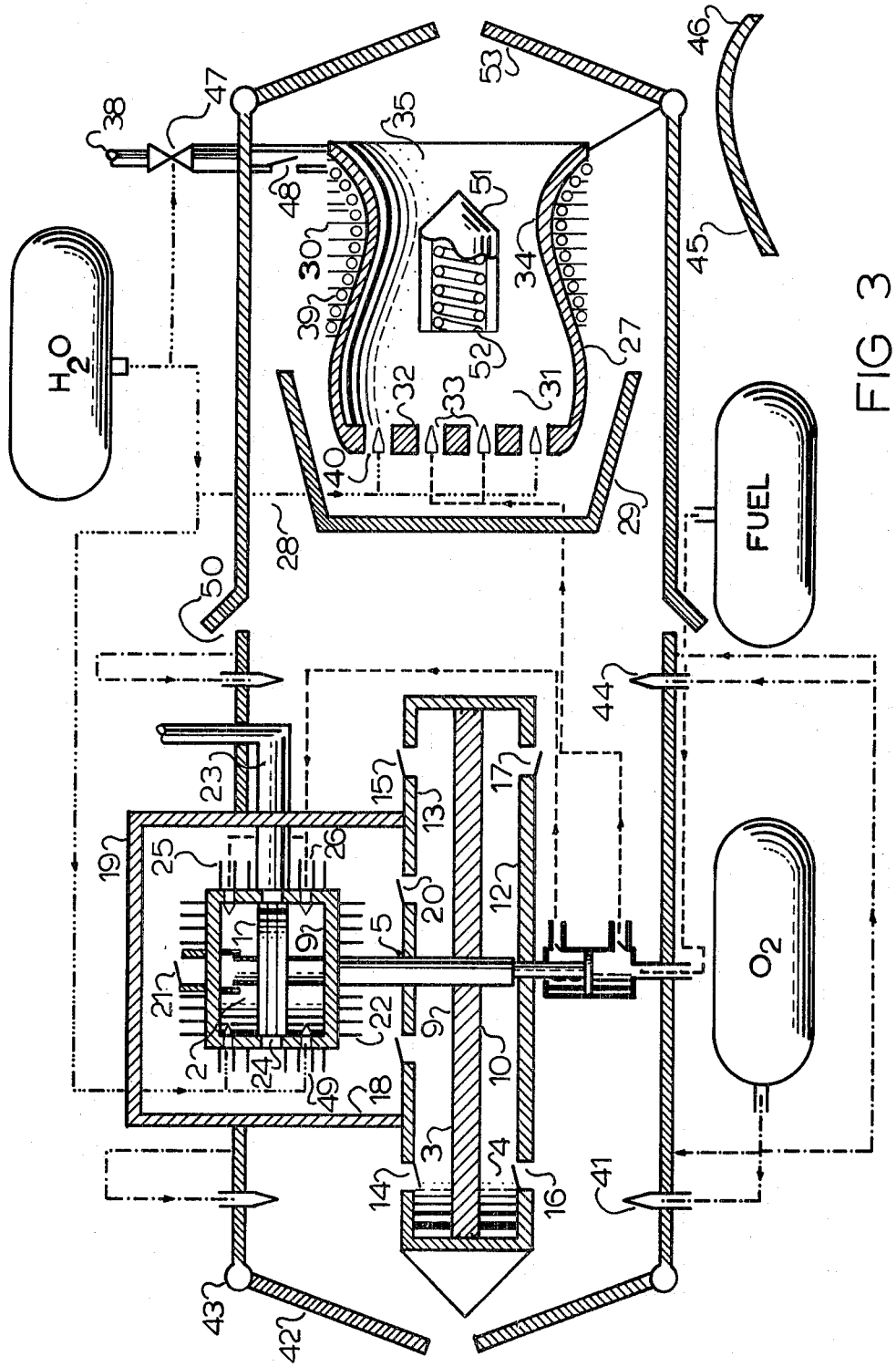

United States Patent Office 3,541,795
Patented Nov. 24, 1970

1

3,541,795
REGENERATIVE PISTON ENGINES
Daniel E. Nelson, Pacific Grove, Calif., assignor to General Kinetics Corporation, Monterey, Calif., a corporation of California
Filed Aug. 17, 1967, Ser. No. 666,228
Int. Cl. F02k 5/02
U.S. Cl. 60—247                               8 Claims

ABSTRACT OF THE DISCLOSURE

A regenerative piston jet engine in which combustion pressure from a double-acting power piston is transferred to a double-acting compressor piston attached to a shaft common to both of said pistons, air compressed by the compressor is conveyed to a combustor and to the power cylinder with optional heat exchange relationship thereto, water for optional thrust augmentation is conveyed to the combustor in heat exchange relationship thereto, onboard oxidizer is directed as an additional option to the power piston and combustor and air mass is directed into the combustion stream by air scoops.

The object of this invention is to provide a light, efficient and smogless reaction engine with high thrust and speed in air, in space or under water at low cost.

This invention is illustrated in the accompanying drawings as follows:

FIG. 1 is a cutaway side view.
FIG. 2 is a cutaway top view.
FIG. 3 is a schematic diagram.

These improvements in reaction engines are shown in FIG. 1 except where noted and comprise: A double acting power piston 1, a power cylinder 2, a double acting compressor piston 3, a compressor cylinder 4, a power shaft 5, a power piston outer head 6, a power piston inner head 7, a power cylinder outer head 8, a power cylinder inner head 9, a compressor piston outer head 10, a compressor piston inner head 11, a compressor cylinder outer head 12, a compressor cylinder inner head 13, inner compressor valved intake ports 14, inner compressor valved outlet ports 15, outer compressor valved intake ports 16, outer compressor valved outlet ports 17, a power cylinder heat exchange chamber 18, a power cylinder heat exchange chamber wall 19, inner valved power cylinder heat exchange ports 20, outer valved power cylinder heat exchange ports 21, power cylinder heat exchange members 22, power cylinder exhaust ports 23, power cylinder intake ports 24, an outer power cylinder injector 25, an inner power cylinder injector 26, a thrust chamber 27, an oxidizer channel 28, an oxidizer baffle 29, thrust chamber heat exchange members 30, a combustion chamber 31, a combustion chamber head 32, combustion inlet ports 33, a thrust chamber throat 34, a thrust chamber nozzle 35, a thrust chamber skirt 36, combustion chamber fuel injectors 37, an augmentation line 38, an augmentation heat exchange tube 39, combustion chamber water injectors 40, a compressor oxidizer injector 41, a compressor scoop 42, compressor scoop hinges 43, a thrust chamber oxidizer injector 44, an air augmentation scoop 45, an air augmentation thrust skirt 46, an augmentation line air valve 47, an augmentation line oxidizer valve 48, power cylinder water injectors 49, ram air intake ports 50, a nozzle plug 51, a nozzle plug spring 52 and thrust chamber doors 53, FIG. 3.

The operation of these improvements in reaction engines is accomplished in the following manner.

Referring to FIG. 1, except where noted double action of the power piston 1 causes air to be compressed by double action of the compressor piston 3. A relatively small part of the air compressed by the compressor piston 1 is directed to the power cylinder 2 heat exchange chamber 19 where it is caused to cool the engine and to be heated. The compressed and heated air is directed into the cylinder 2 after previous combustion gases have been scavenged. It is then further compressed. Fuel is injected into the cylinder 2 and regenerative heat of the air causes ignition at the end of each stroke. There is combustion at one head or side of the piston 1 while compression takes place at the other side during each stroke. Additional pressure at the power cylinder heads can be obtained by injecting water or other media into the cylinders, owing to the favorable combustion conditions from regeneration.

Compressed air not utilized by the power piston 1 and air that may be compressed at the ram air intake ports is channelled to the outside of the thrust chamber skirt 36 around the end of the oxidizer baffle 29, past the thrust chamber regenerative heat exchange members and into the combustion chambers 31 through the inlet ports 33 in the combustion chamber head 32. Fuel is injected into the combustion chamber and combustion is caused thereat to obtain reaction thrust.

Additional mass for thrust augmentation can be provided by channelling fluid such as water in an augmentation tube 38 around the outside of the thrust chamber 31 and into the combustion chamber. Additional mass can be obtained by the air scoop 45 also, by scooping air into the combustion stream. When the engine is moving through the atmosphere, air can be channelled from the air scoop 45 into the augmentation heat exchange tube 39 and into the thrust chamber 31. The augmentation heat exchange tube 39 can convey oxidizer supplied at the augmentation line oxidizer valve 47 when no air, water or other mass are available.

The engine can be operated in rocket mode or partial rocket mode by injecting oxidizer at the oxidizer channel 28 or at the compressor scoop. Air can be enriched or replaced for operating the power piston 1 and the thrust chamber 31 by injection of oxidizer at the compressor intake scoop. Air can be replaced also by injection of oxidizer at the oxidizer channel 28. Oxidizer injection can be used for propulsion in space, to replace air, in near space to enrich air, under water or in other incompatible substances to replace oxygen, or in lower atmosphere to enrich air for additional thrust.

Operation under water or through incompatible environmental combustion conditions necessitates the air scoop. The thrust chamber doors 53, FIG. 3, must be closed when the engine is under water and not being operated or in other environmental conditions not compatible with combustion and not being operated.

Optimum ratio of the thrust chamber throat 34 area to the thrust chamber nozzle area can be obtained for different environmental conditions by a slidable nozzle 35 plug 51. Movement of the widest portion of the nozzle plug away from the thrust chamber head 32 towards the throat 34 area decreases the ratio to obtain higher velocity for lower exit pressure conditions such as in space. Movement of the nozzle plug towards the combustion chamber head 32 increases the ratio for higher mass flow under conditions of higher exit and chamber pressures. Automatic area ratio adjustment can be achieved with a nozzle plug spring 52.

What is claimed is:

1. A regenerative piston jet engine comprising a double acting power piston connected to a double acting compressor piston by a power shaft, a power cylinder and a compressor cylinder in which the respective pistons travel in reciprocating motion, a thrust chamber, valved ports and heat exchange conveyance means connecting said compressor cylinder with said power cylinder and said thrust chamber, inlet and exhaust ports in said power cylinder, inlet ports and a nozzle in said thrust chamber, and fuel injectors at said power cylinder and thrust chamber.

2. In a regenerative piston jet engine substantially as described in claim 1, an air augmentation scoop and thrust skirt that are caused to direct air current into the combustion stream of the combustion chamber.

3. In a regenerative piston jet engine substantially as described in claim 1, an augmentation mass conveyance means in heat exchange relationship to said thrust chamber and facing inlets to said thrust chamber and valved inlets to said conveyance means from oxidizer and non-oxidizer sources.

4. In a regenerative piston jet engine substantially as described in claim 1, combustion chamber inlet ports having venturi pump form in relation to injectors.

5. In a regenerative piston jet engine substantially as described in claim 1, a nozzle plug in slidable contact with the head of said combustion chamber and extended towards the throat thereof, and a nozzle plug spring attached to the nozzle plug and said combustion chamber head.

6. In a regenerative piston jet engine substantially as described in claim 1, oxidizer injection means at the inlet ports to said compressor cylinder and at the conveyance means between said compressor cylinder and said combustion chamber.

7. In a regenerative piston jet engine substantially as described in claim 1, ram air intake ports at the conveyance means between said compressor cylinder and said combustion chamber.

8. In a regenerative piston jet engine substantially as described in claim 1, oxidizer injection means at the inlet ports to said compressor cylinder and at the conveyance means between said compressor cylinder and said combustion chamber, closeable thrust chamber doors and closeable compressor intake scoops.

References Cited

UNITED STATES PATENTS

| | | | |
|---|---|---|---|
| 916,726 | 3/1909 | Lake | 60—247 |
| 2,655,205 | 10/1953 | Linderoth | 60—39.76 |
| 2,920,444 | 1/1960 | Jorgensen | 60—247 |
| 2,937,500 | 5/1960 | Bodine | 60—247 |

DOUGLAS HART, Primary Examiner

U.S. Cl. X.R.

60—267, 269, 271